United States Patent
Wang et al.

(10) Patent No.: US 9,948,575 B2
(45) Date of Patent: Apr. 17, 2018

(54) ISSUING METHOD FOR FORWARDING ADJACENCY LINK

(71) Applicant: Huawei Technologies Co., Ltd., Shenzhen (CN)

(72) Inventors: Jun Wang, Shenzhen (CN); Dapeng Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 135 days.

(21) Appl. No.: 15/048,494

(22) Filed: Feb. 19, 2016

(65) Prior Publication Data
US 2016/0173415 A1    Jun. 16, 2016

Related U.S. Application Data

(63) Continuation of application No. PCT/CN2014/084966, filed on Aug. 22, 2014.

(30) Foreign Application Priority Data

Aug. 22, 2013 (CN) .......................... 2013 1 0369868

(51) Int. Cl.
*H04L 12/947* (2013.01)
*H04L 12/46* (2006.01)
(Continued)

(52) U.S. Cl.
CPC .......... *H04L 49/25* (2013.01); *H04L 12/4641* (2013.01); *H04L 45/02* (2013.01); *H04L 45/04* (2013.01)

(58) Field of Classification Search
None
See application file for complete search history.

(56) References Cited

U.S. PATENT DOCUMENTS

| 8,018,873 B1 | 9/2011 | Kompella |
| 2006/0133298 A1* | 6/2006 | Ng .......................... H04L 45/02 370/254 |

(Continued)

FOREIGN PATENT DOCUMENTS

| CN | 101247664 A | 8/2008 |
| CN | 102201993 A | 9/2011 |

(Continued)

OTHER PUBLICATIONS

Mannie, "Generalized Multi-Protocol Label Switching (GMPLS) Architecture," Network Working Group, Request for Comments 3945, pp. 1-69, IETF Trust, Reston, Virginia (Oct. 2004).

(Continued)

*Primary Examiner* — Diane Lo
(74) *Attorney, Agent, or Firm* — Leydig, Voit & Mayer, Ltd.

(57) ABSTRACT

An issuing method for a forwarding adjacency link and a logical node are provided. The method comprises: a first logical node receiving node information about a second edge forwarding node which is sent by a node management module of a controller in a virtual cluster; according to the node information about the second edge forwarding node, the first logical node generating a logical link between a first edge forwarding node and the second edge forwarding node; the first logical node adding the logical link between the first edge forwarding node and the second edge forwarding node to an IGP protocol message link state advertisement (LSA)/ link state protocol data unit (LSP); and the first logical node issuing the logical link between the first edge forwarding node and the second edge forwarding node through the IGP protocol message LSA/LSP.

18 Claims, 5 Drawing Sheets

(51) Int. Cl.
    *H04L 12/751*     (2013.01)
    *H04L 12/715*     (2013.01)

(56) References Cited

U.S. PATENT DOCUMENTS

| | | |
|---|---|---|
| 2009/0116514 A1 | 5/2009 | Yan et al. |
| 2013/0003745 A1 | 1/2013 | Nishimura |
| 2013/0286893 A1 | 10/2013 | Zhu et al. |
| 2015/0200842 A1 | 7/2015 | Wang |
| 2015/0304218 A1 | 10/2015 | Wang et al. |

FOREIGN PATENT DOCUMENTS

| | | |
|---|---|---|
| CN | 102204188 A | 9/2011 |
| CN | 102792645 A | 11/2012 |
| CN | 102868619 A | 1/2013 |
| CN | 103004147 A | 3/2013 |
| CN | 103067277 A | 4/2013 |
| CN | 103441936 A | 12/2013 |
| EP | 2608459 A2 | 6/2013 |
| WO | WO 2009067865 A3 | 6/2009 |
| WO | WO 2011113394 A2 | 9/2011 |

OTHER PUBLICATIONS

Raszuk et al., "BGP Optimal Route Reflection (BGP-ORR)," IDR Working Group, Internet-Draft, draft-ietf-idr-bgp-optimal-route-reflection-05, pp. 1-21, IETF Trust, Reston, Virginia (Jun. 4, 2013).

Liu et al., "Virtual Router Cluster System Based on the Separation of the Control Plane and the Data Plane," Telecommunications Network Technology, No. 11, Expert Viewpoint (Nov. 15, 2011).

\* cited by examiner

ISSUING METHOD FOR FORWARDING ADJACENCY LINK

CROSS-REFERENCE TO RELATED APPLICATIONS

This application is a continuation of International Patent Application No. PCT/CN2014/084966, filed on Aug. 22, 2014, which claims priority to Chinese Patent Application No. 201310369868.4 filed on Aug. 22, 2013, both of which are hereby incorporated by reference in their entireties.

TECHNICAL FIELD

The present disclosure relates to the field of communication technology, and particularly to a method for advertising a forwarding adjacency link.

BACKGROUND

As shown in FIG. 1, a virtual cluster includes a controller for controlling information transmission and internal nodes and edge forwarding nodes for forwarding information. The edge forwarding nodes are connected to each other by a vFabric logic. The edge forwarding nodes are connected to a border gateway protocol (BGP) router reflector (RR) node of the controller by a virtual generic routing encapsulation (vGRE). A device outside of the virtual cluster performs information transmission through the virtual cluster in the following process: an edge forwarding node FP1 receives a protocol packet sent by the device outside of the cluster and transmits transparently the protocol packet to the controller, and after receiving the protocol packet transmitted by FP1 the controller generates a responsive protocol packet and sends the responsive protocol packet to another device outside of the cluster via another edge forwarding node FP2 as a peer node of FP1. Specifically, the edge forwarding node FP2 can be reached in an interior gateway protocol (IGP) topology. In order to realize the information transmission described above, the vGRE connection between FP1, FP2 and the BGP RR node is required to be advertised to outside of the virtual cluster, that is, the state of a forwarding adjacency (FA) link is advertised to outside of the virtual cluster.

Currently, a method for advertising the FA link state is as follows: an IGP neighborhood relation is established between edge service nodes FPs and between the edge service nodes FPs and the BGP RR node, and when the neighborhood is up, link information between the edge service nodes FPs and between the edge service nodes FPs and the BGP RR node is advertised outside in a flooding way via IGP protocol packet Link State Advertisement LSA/Link State Protocol LSP.

However, in a case that the number of the edge forwarding nodes in the virtual cluster is large, the IGP neighborhood relation is established between every two forwarding nodes, which results in a great pressure on the controller. And in a case that the number of the BGP RR nodes is large, the IGP neighborhood relation is also established between the edge FPs and each of the BGP RR nodes, which will further increase the pressure on the controller. In addition, it is required to perform information interaction between the nodes when the IGP neighborhood relation is established, which has an influence on the advertising speed for the link state. Therefore, the existing method for advertising the FA link state has disadvantages that the pressure on the controller is great and the advertising speed is low.

SUMMARY

A method for advertising a forwarding adjacency link is provided in the present disclosure. In the method, it is not required to establish IGP neighborhood relation between two nodes in a virtual cluster, and therefore the pressure on a virtual cluster system can be reduced, and the advertising speed for link state information can be improved.

In a first aspect of the present disclosure, a method for advertising a forwarding adjacency link is provided, including:

receiving, by a first logical node, node information of a second edge forwarding node sent by a node management module of a controller in a virtual cluster, where the first logical node corresponding to a first edge forwarding node is a logical node in the controller, the first edge forwarding node and the second edge forwarding node are edge forwarding nodes in the virtual cluster, and the second edge forwarding node is a peer node of the first edge forwarding node;

generating, by the first logical node, a logical link between the first edge forwarding node and the second edge forwarding node based on the node information of the second edge forwarding node;

adding, by the first logical node, the logical link between the first edge forwarding node and the second edge forwarding node into an interior gateway protocol IGP protocol packet link state advertisement LSA/link state protocol LSP; and advertising, by the first logical node, the logical link between the first edge forwarding node and the second edge forwarding node via the IGP protocol packet LSA/LSP.

In conjunction with the first aspect of the present disclosure, in a first possible implementation of the first aspect, receiving, by the first logical node, the node information of the second edge forwarding node sent by the node management module of the controller in the virtual cluster includes:

subscribing from an interface management module of the controller, by the first logical node, a logical interface A between the first edge forwarding node and another node in the virtual cluster and a logical interface B between the first edge forwarding node and a border gateway protocol router reflector BGP RR node of the controller;

receiving, by the first logical node, the logical interface A and the logical interface B sent by the interface management module;

acquiring from the node management module of the controller, by the first logical node, the node information of the second edge forwarding node after the logical interface A and the logical interface B are received by the first logical node; and the adding, by the first logical node, the logical link between the first edge forwarding node and the second edge forwarding node into the IGP protocol packet LSA/LSP includes:

adding, by the first logical node, the logical link between the first edge forwarding node and the second edge forwarding node into the IGP protocol packet LSA/LSP after the logical interface A and the logical interface B are up.

In conjunction with the first aspect or the first possible implementation of the first aspect of the present disclosure, in a second possible implementation of the first aspect, there is only one logical link between the first edge forwarding node and the second edge forwarding node.

In conjunction with the first aspect or the first possible implementation of the first aspect of the present disclosure, in a third possible implementation of the first aspect, there is no IGP neighborhood relation established between the first edge forwarding node and the second edge forwarding node.

In conjunction with the first aspect or the first possible implementation of the first aspect of the present disclosure, in a fourth possible implementation of the first aspect, an interior gateway protocol IGP link state database between the first edge forwarding node and the second edge forwarding node is synchronized.

In conjunction with the first possible implementation of the first aspect of the present disclosure, in a fifth possible implementation of the first aspect, the logical interface A is a virtual-fabric vFabric interface, and the logical interface B is a virtual generic routing protocol encapsulation vGRE interface.

In conjunction with the first possible implementation or the fifth possible implementation of first aspect of the present disclosure, in a sixth possible implementation of the first aspect, the method for advertising the forwarding adjacency link further includes: clearing, by the first logical node, the forwarding adjacency link away from the IGP protocol packet LSA/LSP in a case that the logical interface A and the logical interface B are shut down.

In a second aspect, a first logical node is provided, including:
  an acquiring unit configured to receive node information of a second edge forwarding node sent by a node management module of a controller in a virtual cluster, where the first logical node corresponding to a first edge forwarding node is a logical node in the controller, the first edge forwarding node and the second edge forwarding node are edge forwarding nodes in the virtual cluster, and the second edge forwarding node is a peer node of the first edge forwarding node;
  a generating unit configured to generate a logical link between the first edge forwarding node and the second edge forwarding node based on the node information of the second edge forwarding node;
  an adding unit configured to add the logical link between the first edge forwarding node and the second edge forwarding node into an IGP protocol packet link state advertisement LSA/link state protocol LSP; and
  an advertising unit configured to advertise the logical link between the first edge forwarding node and the second edge forwarding node via the IGP protocol packet LSA/LSP.

In conjunction with the second aspect of the present disclosure, in a first possible implementation of the second aspect, the first logical node further includes a subscribing unit and a receiving unit,
  where the subscribing unit is configured to subscribe, from an interface management module of the controller, a logical interface A between the first edge forwarding node and the second edge forwarding node and a logical interface B between the first edge forwarding node and a border gateway protocol router reflector BGP RR node of the controller; and
  the receiving unit is configured to receive the logical interface A and the logical interface B sent by the interface management module;
  where the acquiring unit is further configured to acquire, from the node management module of the controller, the node information of the second edge forwarding node after the logical interface A and the logical interface B are received by the receiving unit; and
  the advertising unit is further configured to add the logical link between the first edge forwarding node and the second edge forwarding node into the IGP protocol packet LSA/LSP after the logical interface A and the logical interface B are up.

In conjunction with the first possible implementation of the second aspect of the present disclosure, in a second possible implementation of the second aspect, the advertising unit is further configured to clear a forwarding adjacency link away from the IGP protocol packet LSA/LSP in a case that the forwarding adjacency link changes and in a case that the logical interface A and the logical interface B are down.

In a third aspect of the present disclosure, a controller in a virtual cluster is provided, which includes the first logical node and the node management module described above, the node management module is configured to send the node information of the second edge forwarding node to the first logical node.

In conjunction with the third aspect of the present disclosure, in a first possible implementation of the third aspect, the controller in the virtual cluster further includes an interface management module configured to send the logical interface A between the first edge forwarding node and the second edge forwarding node and the logical interface B between the first edge forwarding node and the border gateway protocol router reflector node to the first logical node.

In a fourth aspect of the present disclosure, a virtual cluster system is provided, which includes the controller, the first edge forwarding node and the second edge forwarding node described above.

In conjunction with the fourth aspect of the present disclosure, in a first possible implementation of the fourth aspect, there is only one logical link between the first edge forwarding node and the second edge forwarding node.

In conjunction with the fourth aspect of the present disclosure or the first possible implementation of the fourth aspect, in a second possible implementation of the fourth aspect, there is no IGP neighborhood relation established between the first edge forwarding node and the second edge forwarding node.

In conjunction with the fourth aspect of the present disclosure or the first possible implementation of the fourth aspect, in a third possible implementation of the fourth aspect, an interior gateway protocol IGP link state database between the first edge forwarding node and the second edge forwarding node is synchronized.

In the method according to the present disclosure, the first logical node acquires the node information of the second edge node as the peer node, generates the logical link between the first edge forwarding node and the second edge forwarding node, adds the logical link into the link state advertisement LSA or the link state protocol LSP and advertises the logical link. Therefore, in the method according to the present disclosure, there is no IGP neighborhood relation established between the first edge node and the second edge node, an information interaction process required for establishing the IGP neighborhood relation is avoided, the pressure on the virtual cluster system is reduced, and the advertising speed for the link state information is improved.

BRIEF DESCRIPTION OF DRAWINGS

In order to more clearly illustrate the technical solution in the embodiments of the present disclosure, in the following, drawings required in the description of the embodiments will be introduced simply. Obviously, the drawings in the following description are just some embodiments of the disclosure. For those skilled in the art, other drawings can also be obtained according to the drawings without any creative work.

DESCRIPTION OF EMBODIMENTS

Hereinafter, the technical solution in the embodiments of the present disclosure will be described clearly and completely in conjunction with the drawings in the embodiments of the present disclosure. Obviously, the described embodiments are only a part of the embodiments of the present disclosure, but not all the embodiments. All the other embodiments obtained by those skilled in the art based on the embodiments of the present disclosure without creative work will fall within the scope of protection of the present disclosure.

Figure 1:
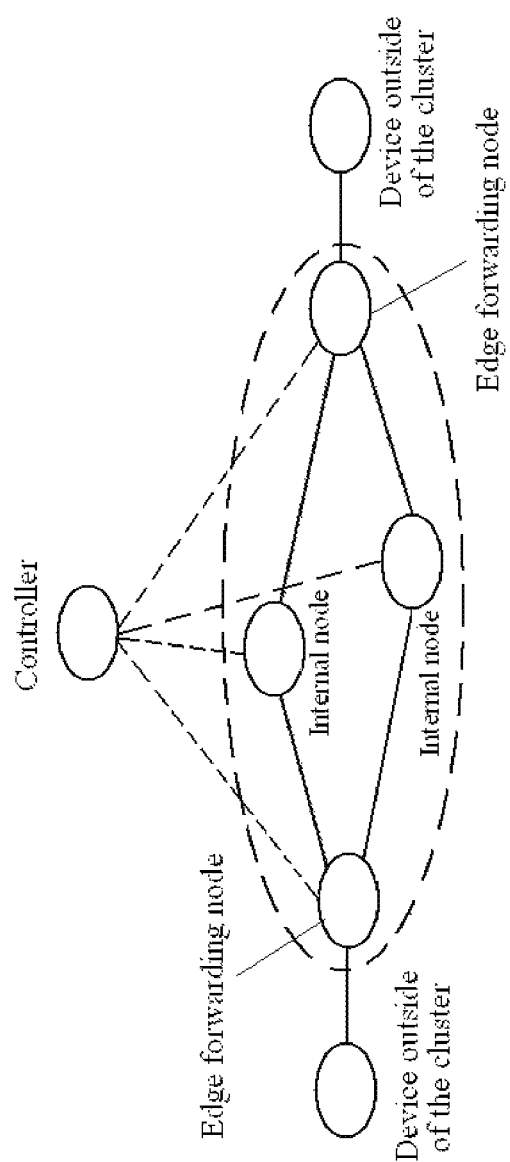
FIG. 1 is a schematic structural diagram of a virtual cluster system.
Figure 2:
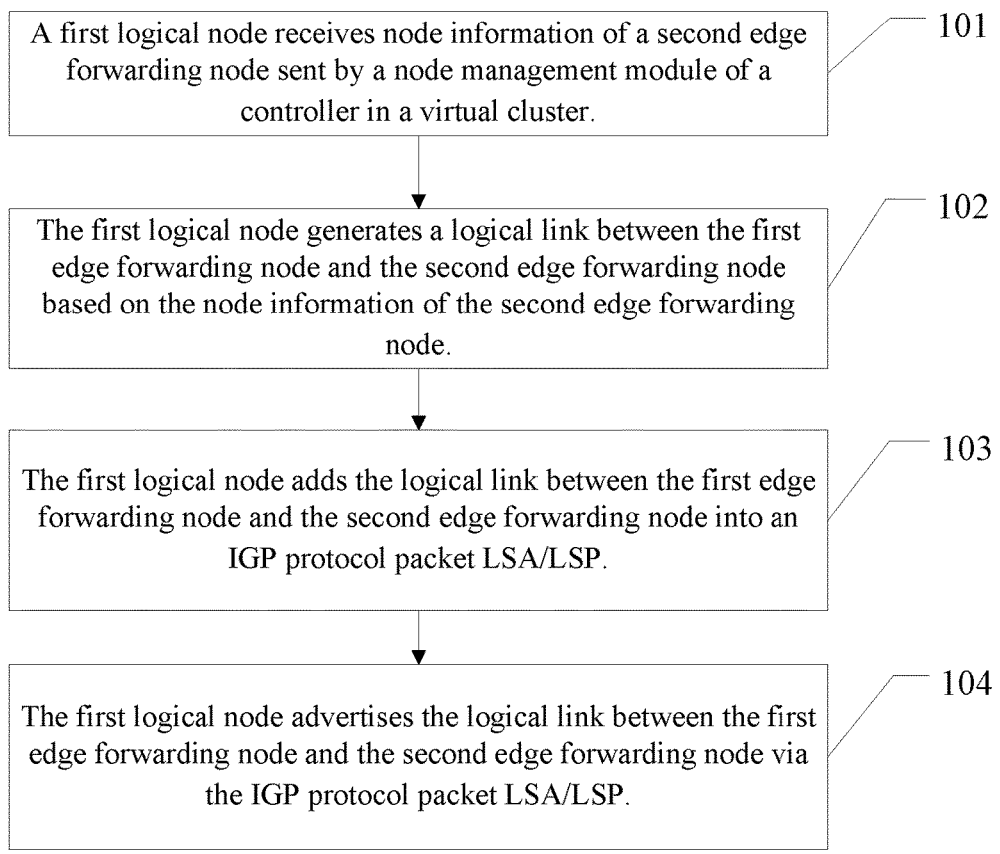
FIG. 2 is a schematic flow chart of a method for advertising a forwarding adjacency link according to an embodiment of the present disclosure.

The method for advertising a forwarding adjacency link is provided in an embodiment of the present disclosure, and referring to FIG. 2 which shows the flow chart of the method, the method includes the following steps.

In step 101, a first logical node receives node information of a second edge forwarding node sent by a node management module of a controller in a virtual cluster. Specifically, the first logical node corresponding to a first edge forwarding node is a logical node in the controller. The first edge forwarding node and the second edge forwarding node are edge forwarding nodes in the virtual cluster. The second edge forwarding node is a peer node of the first edge forwarding node.

In a virtual cluster system, an edge service node corresponds to a logical node in the controller. The logical nodes of the controller corresponding to the first edge forwarding node and the second edge forwarding node are s first logical node and a second logical node, respectively. The controller manages information of all edge forwarding nodes. A logical node corresponding to an edge forwarding node can subscribe from an interface management module of the controller to acquire node information of other edge forwarding nodes. For example, the first logical node can subscribe to acquire the node information of the second edge forwarding node as a peer of the first edge forwarding node. The node information of the second edge forwarding node may include a routing identifier (ID) of the second edge forwarding node, a system ID, a destination IP address or the like.

In step 102, the first logical node generates a logical link between the first edge forwarding node and the second edge forwarding node based on the node information of the second edge forwarding node.

Since the first logical node corresponding to the first edge forwarding node is a logical node in the controller, the first logical node includes node information of the first edge forwarding node (local node). The first logical node can generate the logical link between the first edge forwarding node and the second edge forwarding node after acquiring the node information of the second edge forwarding node (peer node).

In step 103, the first logical node adds the logical link between the first edge forwarding node and the second edge forwarding node into an IGP protocol packet Link State Advertisement LSA/Link State Protocol LSP.

In step 103, the logical link, as information about a state of a forwarding adjacency link, is added into the IGP protocol packet/LSP.

In step 104, the first logical node advertises the logical link between the first edge forwarding node and the second edge forwarding node via the IGP protocol packet LSA/LSP.

The logical link is advertised in a flooding way via the IGP protocol packet LSA/LSP in step 104.

Optionally, in the embodiment described above, there is only one logical link between the first edge forwarding node and the second edge forwarding node.

Optionally, in the embodiment described above, there is no IGP neighborhood relation established between the first edge forwarding node and the second edge forwarding node.

Optionally, in the embodiment described above, an Interior Gateway Protocol IGP link state database between the first edge forwarding node and the second edge forwarding node is synchronized, to acquire latest node information.

Figure 3:
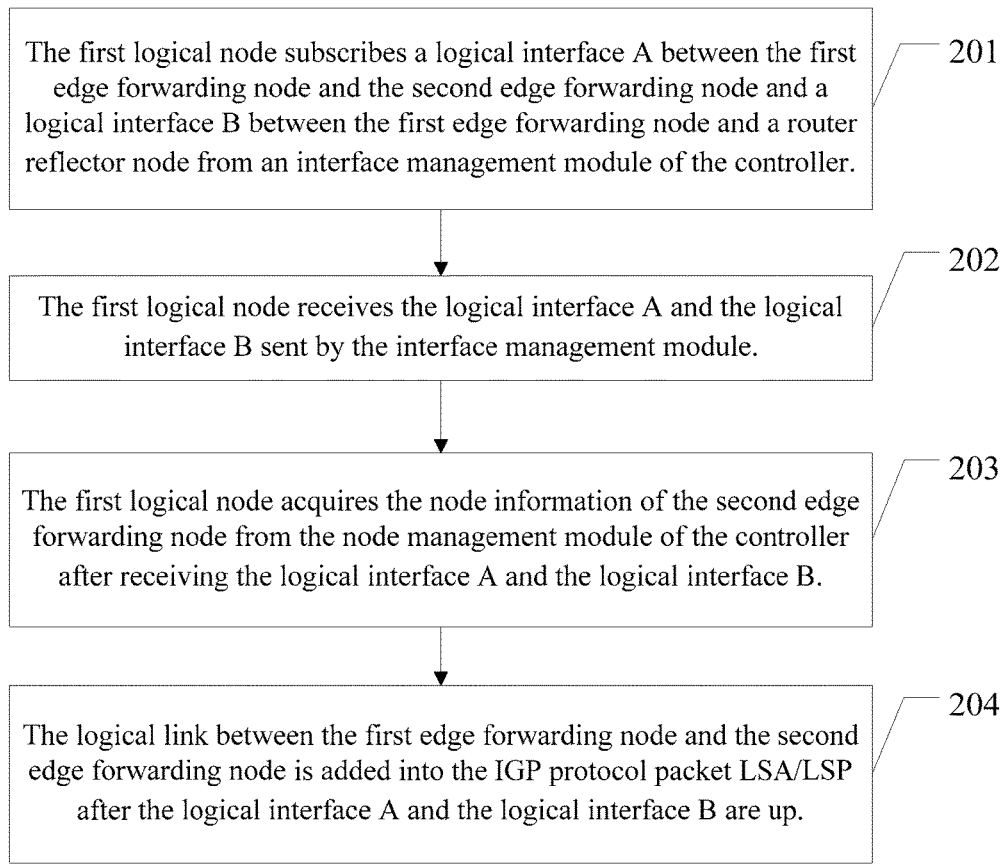
FIG. 3 is a schematic flow chart of sub steps included in step 101 according to the embodiment of the present disclosure.

As shown in FIG. 3, in the embodiment of the present disclosure, step 101 can includes the following steps.

In step 201, the first logical node subscribes a logical interface A between the first edge forwarding node and the second edge forwarding node and a logical interface B between the first edge forwarding node and a border gateway protocol router reflector node from an interface management module of the controller.

In step 202, the first logical node receives the logical interface A and the logical interface B sent by the interface management module.

In step 203, the first logical node acquires the node information of the second edge forwarding node from the node management module of the controller after receiving the logical interface A and the logical interface B.

In step 204, the logical link between the first edge forwarding node and the second edge forwarding node is added into the IGP protocol packet LSA/LSP after the logical interface A and the logical interface B are up.

Optionally, the logical interface A is a virtual-fabric vFabric interface, and the logical interface B is a virtual generic routing protocol encapsulation vGRE interface.

In the embodiment of the present disclosure, an IGP processing module is deployed in the logical node in the controller. The IGP processing module in the first logical node is configured to perform steps 201 to 204 described above. Another IGP processing module is deployed in the BGP RR node of the controller, and the IGP processing module in the BGP RR node is configured to subscribe logical interfaces between the BGP RR node and forwarding nodes in the virtual cluster from the interface management module. For example, the BGP RR node subscribes vGRE interfaces between the BGP RR node and the first edge forwarding node and between the BGP RR node and the second edge forwarding node from the interface management module, respectively. The IGP processing module in the first logical node acquires the node information of the second edge forwarding node from the node management module after receiving the vFabric interface and the vGRE interface subscribed by the IGP processing module of the first logical node and sent by the interface management module. The IGP processing module in the first logical node generates the logical link between the first edge forwarding node and the second edge forwarding node based on the node information of the second edge forwarding node. After the vFabric interface and the vGRE interface received by the IGP processing module in the first logical node are up, the IGP processing module in the first logical node adds the logical link between the first edge forwarding node and the second edge forwarding node into the IGP protocol packet LSA/LSP, and advertises the logical link in a flooding way.

In addition, in the embodiment, the first logical node clears the forwarding adjacency link away from the IGP protocol packet LSA/LSP in a case that the logical interface A and the logical interface B are shut down. That is, in a case that the forwarding adjacency link changes, the logical interface A and the logical interface B are shut down, and the first logical node clears the forwarding adjacency link away from the IGP protocol packet LSA/LSP.

Figure 4:
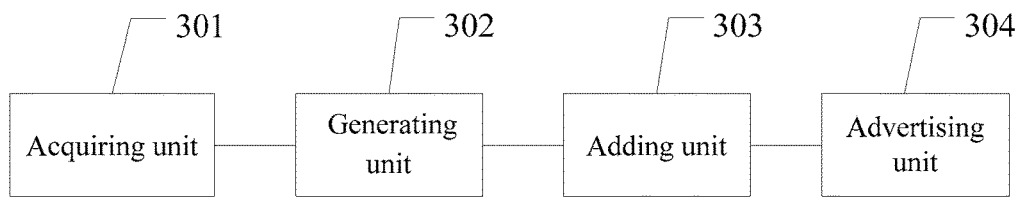
FIG. 4 is a schematic structural diagram of a first logical node according to an embodiment of the present disclosure.

As shown in FIG. 4, a first logical node is further provided in an embodiment of the present disclosure, which includes the followings units.

An acquiring unit 301 is configured to receive node information of a second edge forwarding node sent by a node management module of a controller in a virtual cluster. Specifically the first logical node corresponding to a first edge forwarding node is a logical node in the controller. The first edge forwarding node and the second edge forwarding node are edge forwarding nodes in the virtual cluster. The second edge forwarding node is a peer node of the first edge forwarding node.

A generating unit 302 is configured to generate a logical link between the first edge forwarding node and the second edge forwarding node based on the node information of the second edge forwarding node.

An adding unit 303 is configured to add the logical link between the first edge forwarding node and the second edge forwarding node into an IGP protocol packet link state advertisement LSA/link state protocol LSP.

An advertising unit 304 is configured to advertise the logical link between the first edge forwarding node and the second edge forwarding node via the IGP protocol packet LSA/LSP.

Figure 5:
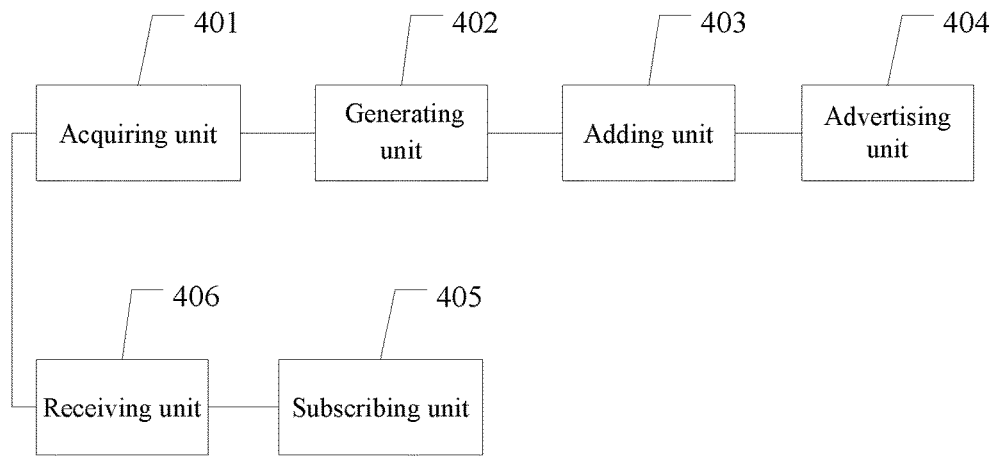
FIG. 5 is a schematic structural diagram of another first logical node according to an embodiment of the present disclosure.

As shown in FIG. 5, another first logical node is further provided in an embodiment of the present disclosure, which includes the following units.

An acquiring unit 401 is configured to receive node information of a second edge forwarding node sent by a node management module of a controller in a virtual cluster. Specifically, the first logical node corresponding to a first edge forwarding node is a logical node in the controller. The first edge forwarding node and the second edge forwarding node are edge forwarding nodes in the virtual cluster. The second edge forwarding node is a peer node of the first edge forwarding node.

A generating unit 402 is configured to generate a logical link between the first edge forwarding node and the second edge forwarding node based on the node information of the second edge forwarding node.

An adding unit 403 is configured to add the logical link between the first edge forwarding node and the second edge forwarding node into an IGP protocol packet link state advertisement LSA/link state protocol LSP.

An advertising unit 404 is configured to advertise the logical link between the first edge forwarding node and the second edge forwarding node via the IGP protocol packet LSA/LSP.

The first logical node further includes a subscribing unit 405 and a receiving unit 406. The subscribing unit 405 is configured to subscribe a logical interface A between the first edge forwarding node and the second edge forwarding node and a logical interface B between the first edge forwarding node and a border gateway protocol router reflector BGP RR node of the controller from an interface management module of the controller.

A receiving unit 406 is configured to receive the logical interface A and the logical interface B sent by the interface management module.

The acquiring module 401 is further configured to acquire the node information of the second edge forwarding node from the node management module of the controller after the logical interface A and the logical interface B are received by the receiving unit 406.

The advertising unit 404 is further configured to add the logical link between the first edge forwarding node and the second edge forwarding node into the IGP protocol packet LSA/LSP after the logical interface A and the logical interface B are up.

Optionally, the advertising unit 404 is further configured to clear a forwarding adjacency link away from the IGP protocol packet LSA/LSP in a case that the forwarding adjacency link changes and in a case that the logical interface A and the logical interface B are down.

Optionally, in the embodiment described above, there is only one logical link between the first edge forwarding node and the second edge forwarding node.

Optionally, in the embodiment described above, there is no IGP neighborhood relation established between the first edge forwarding node and the second edge forwarding node.

Optionally, in the embodiment described above, an interior gateway protocol IGP link state database between the first edge forwarding node and the second edge forwarding node is synchronized, to acquire latest node information.

Figure 6:
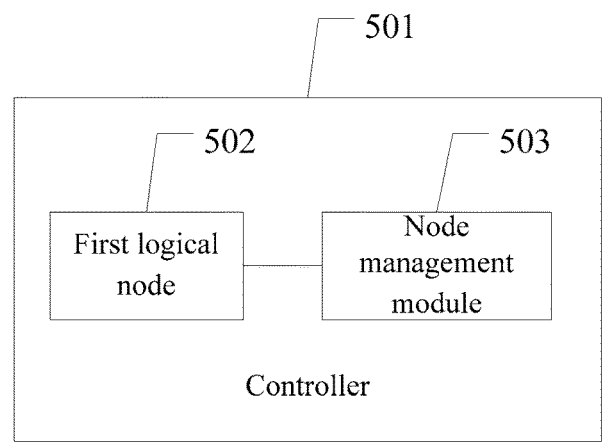
FIG. 6 is a schematic structural diagram of a controller in a virtual cluster according to an embodiment of the present disclosure.

As shown in FIG. 6, a controller 501 in a virtual cluster is further provided in an embodiment of the present disclosure, which includes the first logical node 502 and the node management module 503 described in the above embodiment. The node management module 503 is configured to send the node information of the second edge forwarding node to the first logical node 502.

Figure 7:
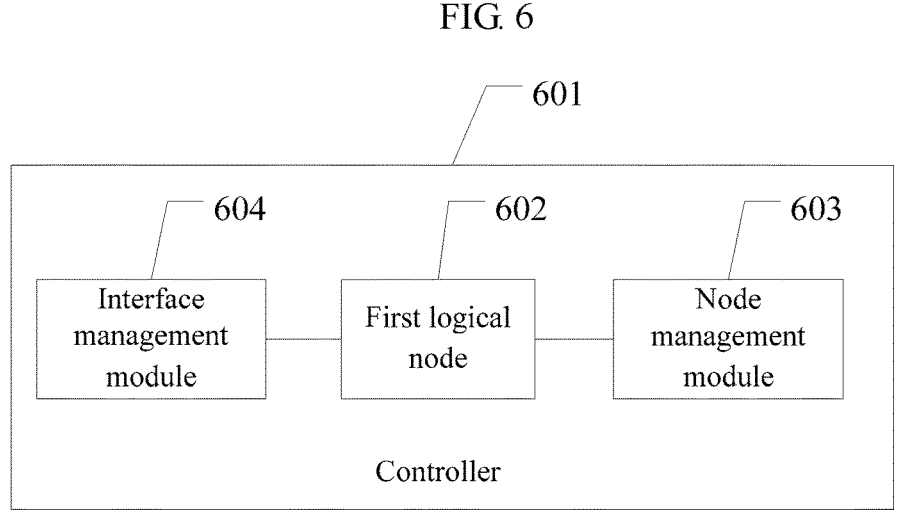
FIG. 7 is a schematic structural diagram of another controller in a virtual cluster according to an embodiment of the present disclosure.

As shown in FIG. 7, another controller 601 in a virtual cluster is further provided in an embodiment of the present disclosure, which includes the first logical node 602 and the node management module 603 described in the above embodiment. The node management module 603 is configured to send the node information of the second edge forwarding node to the first logical node 602. The controller further includes an interface management module 604 configured to send the logical interface A between the first edge forwarding node and the second edge forwarding node and the logical interface B between the first edge forwarding node and the border gateway protocol router reflector node to the first logical node 602.

Figure 8:
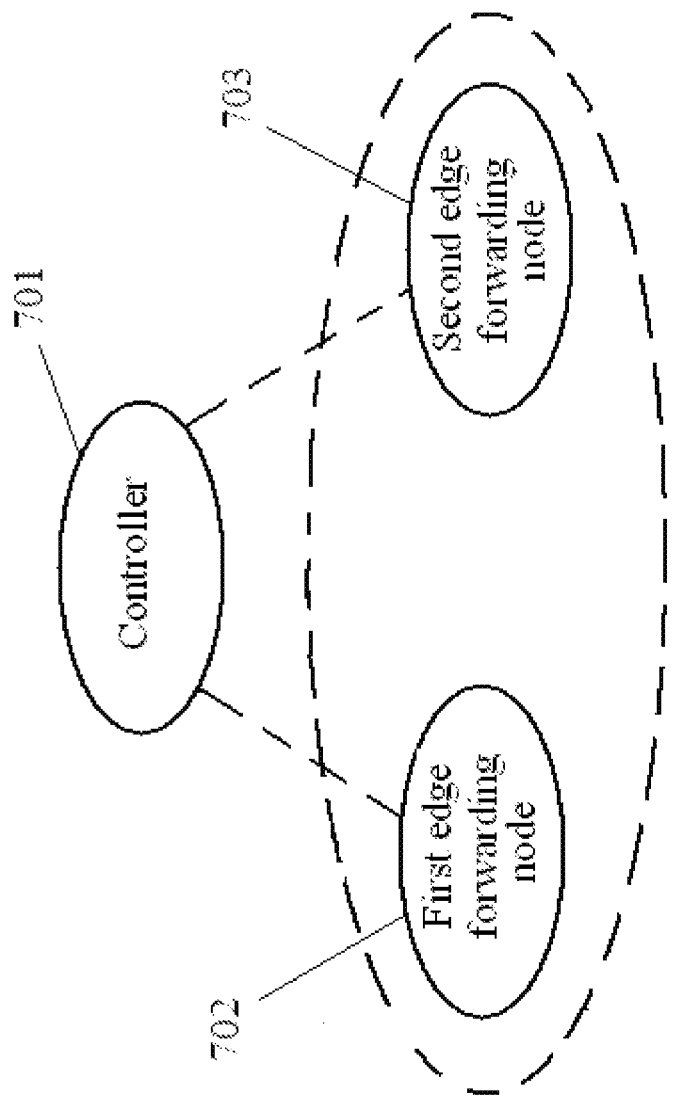
FIG. 8 is a schematic structural diagram of a virtual cluster system according to an embodiment of the present disclosure.

As shown in FIG. 8, a virtual cluster system is further provided in an embodiment of the present disclosure, which includes the controller 701, the first edge forwarding node 702 and the second edge forwarding node 703 described in the above embodiments.

Optionally, there is only one logical link between the first edge forwarding node 702 and the second edge forwarding node 703.

Optionally, there is no IGP neighborhood relation established between the first edge forwarding node 702 and the second edge forwarding node 703.

Optionally, an interior gateway protocol IGP link state database between the first edge forwarding node and the second edge forwarding node 703 is synchronized.

It can be understood by those skilled in the art that all or a part of steps in the method according to the embodiments described above can be implemented in a way of instructing hardware by a program. The program can be stored in a computer readable storage medium, and the storage medium may include a read only memory (ROM), a random access memory (RAM), a magnetic disk or an optical disk.

It can be realized by those skilled in the art that, units and algorithm steps in each example described in conjunction with the embodiments of the present disclosure can be implemented by electronic hardware, computer software and a combination thereof. Whether these functions are implemented in hardware or software depends on a specific application of the technical solution and design constraints. For each specific application, the described function can be implemented in a different method by those skilled in the art, however, the implementation can not be considered to be beyond the scope of the present disclosure.

The method and device for advertising the forwarding adjacency link according to the embodiments of the present disclosure are described in detail above, the principle and the embodiments of the present disclosure are described by a specific example in the specification, the embodiments described above are intended to help understand the method and a core concept of the present disclosure; and for those skilled in the art, changes can be made to the embodiments and an application scope based on the principle of the present disclosure, as above, the specification can not be understood to limit the present disclosure.

What is claimed is:

1. A method for advertising a forwarding adjacency link, comprising:
   subscribing from an interface management module of a controller in a virtual cluster, by a first logical node corresponding to a first edge forwarding node, a logical interface A between the first edge forwarding node and a second edge forwarding node and a logical interface B between the first edge forwarding node and a border gateway protocol router reflector (BGP RR) node of the controller;
   receiving, by the first logical node, the logical interface A and the logical interface B sent by the interface management module;
   acquiring from a node management module of the controller, by the first logical node, node information of the second edge forwarding node after the logical interface A and the logical interface B are received by the first logical node, wherein the first logical node is a logical node in the controller, the first edge forwarding node and the second edge forwarding node are edge forwarding nodes in the virtual cluster, and the second edge forwarding node is a peer node of the first edge forwarding node;
   generating, by the first logical node, a logical link between the first edge forwarding node and the second edge forwarding node based on the node information of the second edge forwarding node;
   adding, by the first logical node, the logical link between the first edge forwarding node and the second edge forwarding node into an interior gateway protocol (IGP protocol) packet link state advertisement (LSA)/link state protocol (LSP) after the logical interface A and the logical interface B are up; and
   advertising, by the first logical node, the logical link between the first edge forwarding node and the second edge forwarding node via the IGP protocol packet LSA/LSP.

2. The method for advertising the forwarding adjacency link according to claim 1, wherein there is only one logical link between the first edge forwarding node and the second edge forwarding node.

3. The method for advertising the forwarding adjacency link according to claim 1, wherein there is no IGP neighborhood relation established between the first edge forwarding node and the second edge forwarding node.

4. The method for advertising the forwarding adjacency link according to claim 1, wherein an interior gateway protocol IGP link state database between the first edge forwarding node and the second edge forwarding node is synchronized.

5. The method for advertising the forwarding adjacency link according to claim 1, wherein the logical interface A is a virtual-fabric (vFabric) interface, and the logical interface B is a virtual generic routing protocol encapsulation (vGRE) interface.

6. The method for advertising the forwarding adjacency link according to claim 1, further comprising: clearing, by the first logical node, the forwarding adjacency link from the IGP protocol packet LSA/LSP when logical interface A and the logical interface B are shut down.

7. A first logical node, comprising:
   a subscribing unit configured to subscribe, from an interface management module of a controller in a virtual cluster, a logical interface A between the first edge forwarding node and a second edge forwarding node and a logical interface B between the first edge forwarding node and a border gateway protocol router reflector BGP RR node of the controller; and
   a receiving unit configured to receive the logical interface A and the logical interface B sent by the interface management module,
   an acquiring unit configured to receive node information of the second edge forwarding node sent by a node management module of the controller after the logical interface A and the logical interface B are received by the receiving unit wherein the first logical node corresponding to a first edge forwarding node is a logical node in the controller, the first edge forwarding node and the second edge forwarding node are edge forwarding nodes in the virtual cluster, and the second edge forwarding node is a peer node of the first edge forwarding node;
   a generating unit configured to generate a logical link between the first edge forwarding node and the second edge forwarding node based on the node information of the second edge forwarding node;
   an adding unit configured to add the logical link between the first edge forwarding node and the second edge forwarding node into an interior gateway protocol IGP protocol packet link state advertisement LSA/link state protocol LSP after the logical interface A and the logical interface B are up; and an advertising unit configured to advertise the logical link between the first edge forwarding node and the second edge forwarding node via the IGP protocol packet LSA/LSP.

8. The first logical node according to claim 7, wherein the advertising unit is further configured to clear a forwarding adjacency link away from the IGP protocol packet LSA/LSP in a case that the forwarding adjacency link changes and in a case that the logical interface A and the logical interface B are down.

9. A controller in a virtual cluster, comprising:

a non-transitory memory storage storing instructions;

one or more processors in communication with the memory, wherein the one or more processors execute the instructions to:

subscribe a logical interface A between a first edge forwarding node and a second edge forwarding node and a logical interface B between the first edge forwarding node and a border gateway protocol router reflector (BGP RR) node of the controller;

receive the logical interface A and the logical interface B;

acquire node information of the second edge forwarding node after the logical interface A and the logical interface B are received, wherein the first edge forwarding node and the second edge forwarding node are edge forwarding nodes in the virtual cluster, and the second edge forwarding node is a peer node of the first edge forwarding node;

generate a logical link between the first edge forwarding node and the second edge forwarding node based on the node information of the second edge forwarding node;

add the logical link between the first edge forwarding node and the second edge forwarding node into an interior gateway protocol (IGP protocol) packet link state advertisement (LSA)/link state protocol (LSP) after the logical interface A and the logical interface B are up; and advertise the logical link between the first edge forwarding node and the second edge forwarding node via the IGP protocol packet LSA/LSP.

10. A virtual cluster system, comprising the controller according to claim 9, the first edge forwarding node and the second edge forwarding node.

11. The virtual cluster system according to claim 10, wherein there is only one logical link between the first edge forwarding node and the second edge forwarding node.

12. The virtual cluster system according to claim 10, wherein there is no interior gateway protocol IGP neighborhood relation established between the first edge forwarding node and the second edge forwarding node.

13. The virtual cluster system according to claim 10, wherein an interior gateway protocol IGP link state database between the first edge forwarding node and the second edge forwarding node is synchronized.

14. The controller in the virtual cluster according to claim 9, wherein there is only one logical link between the first edge forwarding node and the second edge forwarding node.

15. The controller in the virtual cluster according to claim 9, wherein there is no IGP neighborhood relation established between the first edge forwarding node and the second edge forwarding node.

16. The controller in the virtual cluster according to claim 9, wherein an interior gateway protocol IGP link state database between the first edge forwarding node and the second edge forwarding node is synchronized.

17. The controller in the virtual cluster according to claim 9, wherein the logical interface A is a virtual-fabric (vFabric) interface, and the logical interface B is a virtual generic routing protocol encapsulation (vGRE) interface.

18. The controller in the virtual cluster according to claim 9, wherein the one or more processors further execute the instructions to: clear the forwarding adjacency link from the IGP protocol packet LSA/LSP when logical interface A and the logical interface B are shut down.

* * * * *